W. E. VAN DORN.
TRACTOR.
APPLICATION FILED MAR. 21, 1917.
1,302,607.
Patented May 6, 1919.
3 SHEETS—SHEET 1.
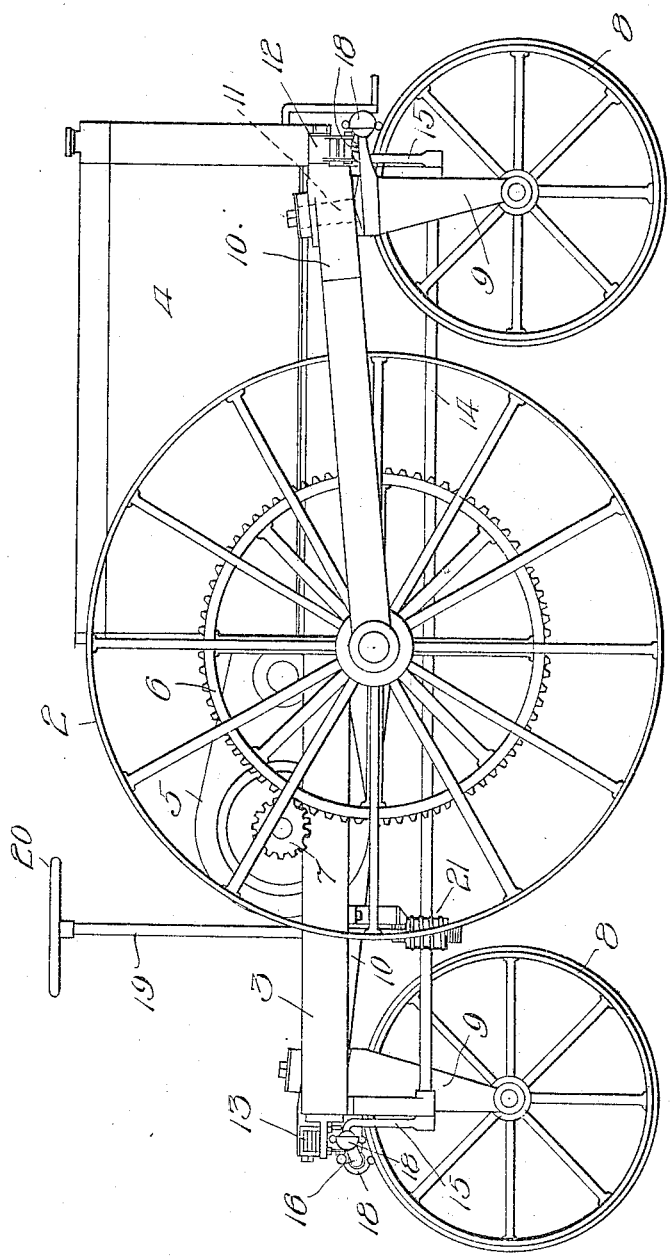

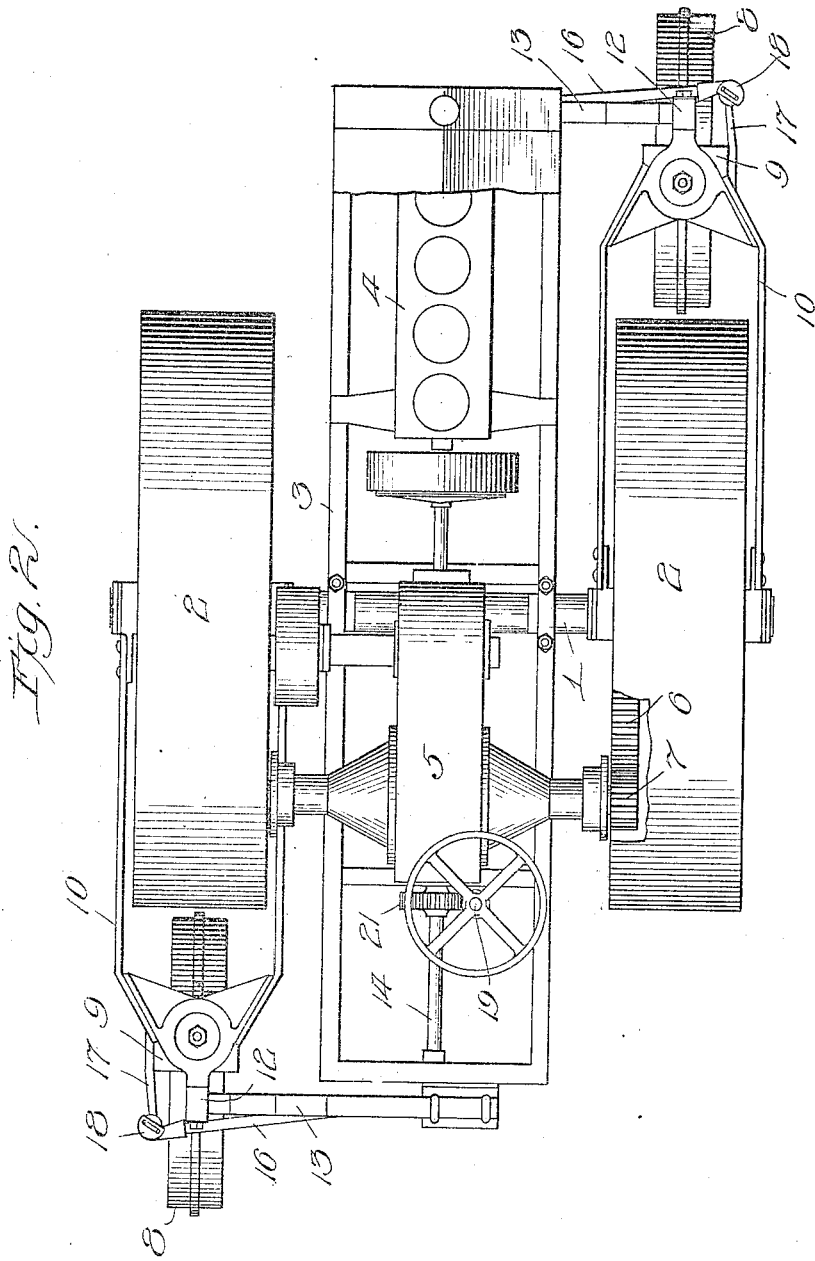

W. E. VAN DORN.
TRACTOR.
APPLICATION FILED MAR. 21, 1917.
1,302,607.
Patented May 6, 1919.
3 SHEETS—SHEET 3.
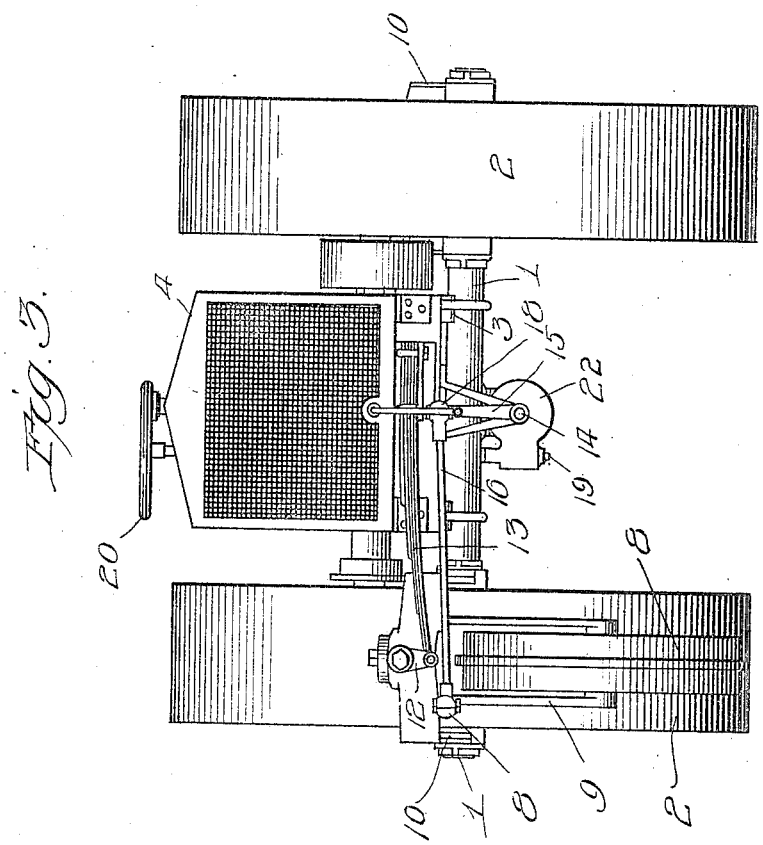

UNITED STATES PATENT OFFICE.

WILLIAM E. VAN DORN, OF CHICAGO, ILLINOIS.

TRACTOR.

1,302,607.        Specification of Letters Patent.        Patented May 6, 1919.

Application filed March 21, 1917. Serial No. 156,235.

*To all whom it may concern:*

Be it known that I, WILLIAM E. VAN DORN, a citizen of the United States, residing at Chicago, county of Cook, State of Illinois, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

My invention has for one of its objects to produce a simple and novel tractor in which the weight will be so distributed that all of it is transmitted to the traction wheels.

A further object of my invention is to produce a simple and novel tractor which may be steered easily and be capable of turning on a small radius.

A further object of my invention is to produce a novel tractor in which the load shall be borne upon a single pair of tractor wheels so as to make the entire weight useful for securing traction, and avoid excess dead weight.

The various features of novelty whereby my invention is characterized will hereinafter be pointed out with particularity in the claims; but, for a full understanding of my invention, and of its objects, including those enumerated and others, and advantages, reference may be had to the following detailed description taken in connection with the accompanying drawings wherein:

Figure 1 is a side elevation of a tractor arranged in accordance with a preferred form of my invention;

Fig. 2 is a top plan view of the tractor shown in Fig. 1; and

Fig. 3 is a front elevation of the tractor.

Referring to the drawings, 1 represents an axle on the ends of which are rotatably mounted a pair of traction wheels, 2, 2. On the axle is mounted a frame, 3 on which the superstructure is carried; the axle being placed about midway between the front and rear ends of the frame or in such other location as may be necessary in order to secure a substantial balancing of the superstructure upon the axle.

In the arrangement shown, there is an engine, 4, mounted on the front end of the frame while on the frame in rear of the axle is a suitable differential drive, 5, operatively connected in any suitable way to the engine to be actuated thereby. Each of the traction wheels has on the inner side thereof a large gear wheel, 6, with which meshes a pinion, 7, driven by the differential; the parts being so arranged that the pinion lies behind the gear wheel.

In front of one of the traction wheels and in rear of the other traction wheel are small steering wheels, 8. Each of the steering wheels lies between and is journaled in the lower ends of the arms of a vertical fork, 9, connected at its upper end to the closed end of a horizontal fork, 10, the arms of which lie on opposite sides of the corresponding traction wheel and are journaled at their ends upon the axle. The connection between the members 9 and 10 is such that the members are free to rotate about axes which make a slight angle to the vertical. This may conveniently be accomplished by providing each of the forks 9 with a cylindrical shank or stem, 11, passing through a suitable bearing in the overlying portion of the corresponding horizontal fork. The parts are so proportioned that the axes of the steering wheels are spaced farther away from a vertical plane containing the axis of the traction wheels than are the bearings between the members 9 and 10.

On the end of each of the members 10 is a depending clevis, 12, adapted to swing about an axis extending longitudinally of the tractor. The lower end of each clevis is attached to the outer end of a supporting arm, 13, the inner end of which arm is fixed to the corresponding end of the tractor frame; the supporting arm being preferably made resilient and the resiliency being preferably secured by making the arm in the form of half of a semi-elliptic spring.

The tractor is steered by causing the forks 9 to turn about their pivotal axes. This way conveniently be accomplished by extending underneath the frame of the tractor a longitudinal rod 14, on each end of which is a radially extending arm, 15, which normally lies above the rod 14. A connecting rod, 16, extends between the upper end of each of the arms 15 to an arm, 17, projecting forwardly or rearwardly, as the case may be, from the corresponding steering fork 9; the joints, 18, at the ends of the connecting rods, being preferably universal joints.

The steering rod, 14, may be actuated from a vertical steering shaft, 19, provided at its upper end with a wheel, 20, and geared at its lower end to the member 14 by a suitable worm and worm wheel, 21, inclosed in a casing, 22.

It will be seen that the entire weight of the tractor superstructure is borne directly by the traction wheels, the steering wheels serving, not as load carriers, but simply as balancing devices for keeping the tractor frame horizontal. In the arrangement shown, there is more or less of a downward thrust on the rear steering wheel, while the tractor is being driven ahead, due to the backward thrust of the driving pinions, but the balancing spring at the rear is made strong enough so that it will resist this thrust and thus make it unnecessary to provide a useless deadweight for overcoming it.

Although the best results, so far as securing the greatest tractive effort for a given weight will be obtained by having the entire load balanced on the two tractor wheels or, if overbalanced, having the excess on the end which will tend to rise as a result of transmitting the driving force to the tractor wheels in traveling ahead; it will of course be understood that my invention is not limited to an exact or even an approximate balancing, viewed in its broadest aspects.

It will also be seen that each traction wheel is hitched to one of the steering wheels so that it will positively be pulled in one direction or the other by the steering wheel, in making a turn. In shifting the steering wheels for the purpose of making a turn, the steering wheel which is in advance is the guiding wheel while the other steering wheel takes a position behind and transverse to its traction wheel and thus serves as a brake or holding device which makes the tractor tend to pivot about a point of contact between the latter traction wheel and the ground; so that, while such a pure pivotal action may not actually take place, the turning will be effected on an extremely short radius.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a tractor, a pair of traction wheels, a body structure balanced on said traction wheels, steering wheels arranged at approximately the same distance from the longitudinal axis as the traction wheels and located one in front of one of the traction wheels and the other behind the other traction wheel, and a steadying arm extending from each steering wheel to the adjacent end of the body structure.

2. In a tractor, a pair of traction wheels, a body structure balanced on said traction wheels, steering wheels arranged at approximately the same distance from the longitudinal axis as the traction wheels and located one in front of one of the traction wheels and the other behind the other traction wheel, and a resilient steadying arm extending from each steering wheel to the adjacent end of the body structure.

3. In a tractor, a pair of axially alined traction wheels, a body structure balanced on said traction wheels, steering wheels arranged one in front of one of the traction wheels and the other behind the other traction wheel, a member extending from the axis of each of the traction wheels to the corresponding steering wheel and supporting the latter for rotation about its own axis and about an approximately vertical axis, means for turning said steering wheels simultaneously about their approximately vertical axes.

4. In a tractor, a pair of axially alined traction wheels, a body structure balanced on said traction wheels, forks each of which embraces between its arms one of the traction wheels, one of the forks extending rearwardly and the other forwardly, means connecting each traction wheel and fork to permit them to move independently about the axis of the traction wheels, a pair of steering wheels, means for supporting each of said steering wheels at the outer end of one of the forks so as to be rotatable about its own axis and movable about an approximately vertical axis.

5. In a tractor, a pair of axially alined traction wheels, a body structure balanced on said traction wheels, forks each of which embraces between its arms one of the traction wheels, one of the forks extending rearwardly and the other forwardly, means connecting each traction wheel and fork to permit them to move independently about the axis of the traction wheels, a pair of steering wheels, means for supporting each of said steering wheels at the outer end of one of the forks so as to be rotatable about its own axis and movable about an approximately vertical axis, and means for simultaneously shifting said steering wheels about their approximately vertical pivotal axes.

6. In a tractor, a pair of axially alined traction wheels, steering wheels arranged one in front of one of the traction wheels and the other behind the other traction wheel, and a body structure supported by said wheels, each steering wheel being at approximately the same distance from the longitudinal axis of the tractor as the corresponding traction wheel.

7. In a tractor, a body structure, four wheels arranged two on each side of said body structure, two of the wheels having a common axis and the other two being rotatable about axes lying respectively in front of and behind the aforesaid axis, each steering wheel being at approximately the same distance from the longitudinal axis of the tractor as the corresponding traction wheel.

In testimony whereof, I sign this specification.

WILLIAM E. VAN DORN.

Copies of this patent may be obtained for five cents each, by addressing the "Commissioner of Patents, Washington, D. C."